United States Patent
Kimura et al.

(10) Patent No.: US 12,105,496 B2
(45) Date of Patent: Oct. 1, 2024

(54) PRODUCTION SYSTEM, HOST CONTROL DEVICE, CONTROL DEVICE, COMMUNICATION METHOD, AND PROGRAM

(71) Applicant: Kabushiki Kaisha Yaskawa Denki, Kitakyushu (JP)

(72) Inventors: Hajime Kimura, Kitakyushu (JP); Seishiro Sakaguchi, Kitakyushu (JP); Hiromasa Shimizu, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 186 days.

(21) Appl. No.: 17/352,554

(22) Filed: Jun. 21, 2021

(65) Prior Publication Data

US 2021/0405606 A1 Dec. 30, 2021

(30) Foreign Application Priority Data

Jun. 30, 2020 (JP) .................................. 2020-113005

(51) Int. Cl.
*G05B 19/05* (2006.01)
*G05B 19/418* (2006.01)
*G06F 9/50* (2006.01)

(52) U.S. Cl.
CPC ......... *G05B 19/056* (2013.01); *G05B 19/054* (2013.01); *G05B 19/41835* (2013.01); *G06F 9/5016* (2013.01)

(58) Field of Classification Search
CPC ................ G05B 19/056; G05B 19/054; G05B 19/41835; G05B 19/4155; G05B 2219/32026; G06F 9/5016; G06F 9/547
See application file for complete search history.

(56) References Cited

U.S. PATENT DOCUMENTS

| | | | | |
|---|---|---|---|---|
| 4,897,777 A | * | 1/1990 | Janke | G05B 19/052 700/5 |
| 5,266,878 A | * | 11/1993 | Makino | G05B 19/4181 700/169 |
| 5,963,444 A | * | 10/1999 | Shidara | G05B 19/052 700/20 |
| 7,962,917 B2 | | 6/2011 | Lawrence et al. | |
| 2003/0040840 A1 | * | 2/2003 | Hirayama | G05B 19/425 700/245 |

(Continued)

FOREIGN PATENT DOCUMENTS

| | | | | |
|---|---|---|---|---|
| EP | 0 100 684 A2 | | 2/1984 | |
| EP | 1426842 B1 | * | 10/2011 | ............ B25J 9/1682 |

(Continued)

OTHER PUBLICATIONS

Hajimu Inaba, "Cell control apparatus and method", Feb. 8, 1983, European Patent Application/European Patent Office, Patent Application EP0100684A2 (Year: 1983).*

(Continued)

*Primary Examiner* — Christopher W Carter
(74) *Attorney, Agent, or Firm* — Oblon, McClelland, Maier & Neustadt, L.L.P.

(57) ABSTRACT

A production system includes a control device that controls one or more industrial devices, and a host control device that communicably connects to the control device and controls the control device. The host control device includes a register memory allocated for control of the control device and including a command area, and transmission circuitry that transmits multiple command data sets stored in the command area of the control device to the control device, and the control device includes a communication memory in which the multiple command data sets received from the host control device are stored, and processing circuitry that executes a process instructed by the host control device based on the multiple command data sets stored in the communication memory.

18 Claims, 8 Drawing Sheets

(56) References Cited

U.S. PATENT DOCUMENTS

| | | | | |
|---|---|---|---|---|
| 2004/0015570 A1* | 1/2004 | Daum | ............... | H04L 12/2814 |
| | | | | 709/220 |
| 2005/0038528 A1* | 2/2005 | McKelvey | ............... | G06F 8/24 |
| | | | | 700/83 |
| 2010/0063608 A1 | 3/2010 | Miller | | |
| 2011/0184549 A1* | 7/2011 | Matsumoto | ........ | G05B 19/4068 |
| | | | | 700/159 |
| 2014/0172148 A1* | 6/2014 | Miller | ............... | G05B 19/414 |
| | | | | 700/184 |
| 2020/0366513 A1* | 11/2020 | Yoneda | ............... | H04L 67/62 |

FOREIGN PATENT DOCUMENTS

| | | | |
|---|---|---|---|
| JP | 11-221950 A | 8/1999 | |
| JP | 2003-150380 A | 5/2003 | |
| JP | 2012-194678 A | 10/2012 | |
| JP | 2018-147017 A | 9/2018 | |

OTHER PUBLICATIONS

Extended European Search Report issued Nov. 12, 2021 in corresponding European Patent Application No. 21182767.0, 7 pages.

Notice of Reasons for Refusal issued Jan. 10, 2023 in Japanese Patent Application No. 2020-113005 (with English machine translation), 6 pages.

Office Action issued in Chinese Patent Application No. 202110500058.2, dated Oct. 27, 2023, with concise English translation.

EPO Communication issued May 8, 2024 in European Patent Application No. 21182767.0.

\* cited by examiner

FIG. 2

| Offset | First tier | Second tier | Third tier | Fourth tier | Name |
|---|---|---|---|---|---|
| 0000 | InterfaceVer | | | | Data structure version |
| ... | ... | ... | ... | ... | ... |
| 0012 | ResponsData | SyncCounter | | | Reception communication counter |
| 0014 | | FixData | if_ver | Major | Major version |
| ... | | ... | ... | ... | ... |
| 0413 | | CmdAnswer | AnsHeader_0 | CmdReqid | Command request ID |
| 0415 | | | | MainCmd | Main command |
| 0416 | | | | SubCmd | Subcommand |
| 0417 | | | | ReturnCode | Return value |
| 0418 | | | | AddDataOfs | Offset to additional data |
| 0419 | | | AnsHeader_1 | Same as above | Same as above |
| ... | | | ... | ... | ... |
| 0504 | | | AnsData | | Answer data area |
| 1055 | | CollectHeader | Controllerid | | Controller identification ID |
| ... | | ... | ... | | ... |
| 1075 | | CollectData | | | Data area |
| 2042 | CommandData | SyncCounter | | | Transmission communication counter |
| ... | | ... | ... | ... | ... |
| 2163 | | CmdRequest | CmdReqid | | Command request ID |
| 2165 | | | MainCmd | | Main command |
| 2166 | | | SubCmd | | Subcommand |
| 2167 | | | CmdArea | | Command data area |
| 2500 | CmdAnsWork | CmdAnswerNow | AnsHeader | CmdReqid | Command request ID |
| 2502 | | | | MainCmd | Main command |
| 2503 | | | | SubCmd | Subcommand |
| 2504 | | | | ReturnCode | Return value |
| 2505 | | | | AddDataOfs | Offset to additional data |
| 2506 | | | AnsData | | Answer data area |
| 2951 | FixMonSelect | GrpMonChSei | | | Group monitor CH selection |
| ... | ... | ... | ... | ... | ... |
| 4259 | Dummy | | | | Reserve |

| Main command | Subcommand | Name | Command data area |
|---|---|---|---|
| 1 | 1 | Alarm reset | None |
| | 2 | Power supply control | Value of On/Off |
| | 3 | Robot program selection | Robot program name, start portion, and the like |
| | 4 | Mode switching | Mode information |
| | 5 | Robot program execution | None |
| | 6 | Robot operation | Position information and the like |
| | . . . | . . . | . . . |
| 2 | 1 | Reading of monitor setting | None |
| | 2 | Reading of robot program information | Robot program type information and the like |
| | . . . | . . . | . . . |
| 3 | 1 | Reading of collection setting | None |
| | 2 | Collection start | None |
| | . . . | . . . | . . . |

| Register number | Variable |
|---|---|
| GW05000 | 1 |
| ... | ... |
| GW05012 | 15 |
| GW05014 | 1 |
| ... | ... |
| GW05413 | 2 |
| GW05415 | 1 |
| GW05416 | 5 |
| GW05417 | 0 |
| GW05418 | - |
| GW05419 | 1 |
| ... | ... |
| GW05504 | - |
| GW06055 | 10 |
| ... | ... |
| GW06075 | - |
| GW07042 | 25 |
| ... | ... |
| GW07163 | 2 |
| GW07165 | 1 |
| GW07166 | 5 |
| GW07167 | - |
| GW07500 | 2 |
| GW07502 | 1 |
| GW07503 | 5 |
| GW07504 | 0 |
| GW07505 | - |
| GW07506 | - |
| GW07951 | 1 |
| ... | ... |
| GW09259 | - |

D3

FIG. 6
| GW07163 (Command request ID) | 0 |
|---|---|
| GW07165 (Main command) | – |
| GW07166 (Subcommand) | – |
| GW07167~GW07499 (Command data area) | – |
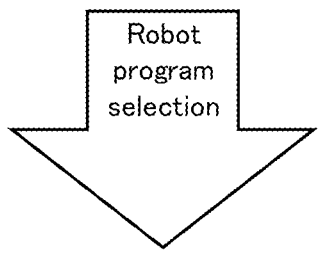
Robot program selection
| GW07163 (Command request ID) | 1 |
|---|---|
| GW07165 (Main command) | 1 |
| GW07166 (Subcommand) | 3 |
| GW07167~GW07499 (Command data area) | AAA 3rd line |
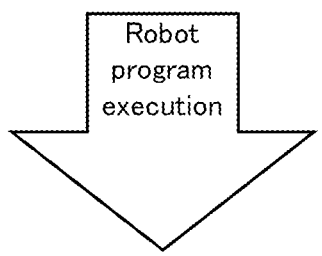
Robot program execution
| GW07163 (Command request ID) | 2 |
|---|---|
| GW07165 (Main command) | 1 |
| GW07166 (Subcommand) | 5 |
| GW07167~GW07499 (Command data area) | – |

PRODUCTION SYSTEM, HOST CONTROL DEVICE, CONTROL DEVICE, COMMUNICATION METHOD, AND PROGRAM

CROSS-REFERENCE TO RELATED APPLICATIONS

The present application is based upon and claims the benefit of priority to Japanese Patent Application No. 2020-113005, filed Jun. 30, 2020, the entire contents of which are incorporated herein by reference.

BACKGROUND OF THE INVENTION

Field of the Invention

The present disclosure relates to a production system, a host control device, a control device, a communication method, and a program.

Description of Background Art

Japanese Patent Application Laid-Open Publication No. 2012-194678 describes a technology in which a program is created by describing an operation of a host control device such as a PLC (Programmable Logic Controller) in a ladder chart, and the host control device executes the program. The entire contents of this publication are incorporated herein by reference.

SUMMARY OF THE INVENTION

According to one aspect of the present invention, a production system includes a control device that controls one or more industrial devices, and a host control device that communicably connects to the control device and controls the control device. The host control device includes a register memory allocated for control of the control device and including a command area, and transmission circuitry that transmits multiple command data sets stored in the command area of the control device to the control device, and the control device includes a communication memory in which the multiple command data sets received from the host control device are stored, and processing circuitry that executes a process instructed by the host control device based on the multiple command data sets stored in the communication memory.

According to another aspect of the present invention, a host control device communicably connects to a control device for controlling one or more industrial devices and includes a register memory having a register that is allocated for controlling the control device and including a command area, and transmission circuitry that transmits multiple command data sets stored in the command area to the control device.

According to yet another aspect of the present invention, a control device communicatively connects to a host control device, controls one or more industrial devices, and includes a communication memory that stores multiple command data sets when the multiple command data sets stored in a command area of a register of the host control device are received from the host control device, and processing circuitry that executes a process instructed by the host control device based on the multiple command data sets stored in the communication memory. The register is allocated for controlling the control device.

According to still another aspect of the present invention, a method for communicating a production system includes transmitting, to a control device in a production system, multiple command data sets stored in a command area of a register of a host control device in the production system, and executing a process instructed by the host control device based on the multiple command data sets stored in a communication memory which stores the multiple command data sets received from the host control device. The control device controls one or more industrial devices in the production system, the host control device controls the control device and is communicably connected to the control device in the production system, and the register of the host control device is allocated for controlling the control device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates a data storage example of structure data;

FIG. 3 illustrates a data storage example of command definition data in which a relationship between a combination of a main command and a subcommand and a process to be executed by a robot controller is defined;

FIG. 5 illustrates a data storage example of variables stored in a register part;

FIG. 6 illustrates an example of values of variables when a robot program is selected and executed;

DETAILED DESCRIPTION OF THE EMBODIMENTS

Figure 1:
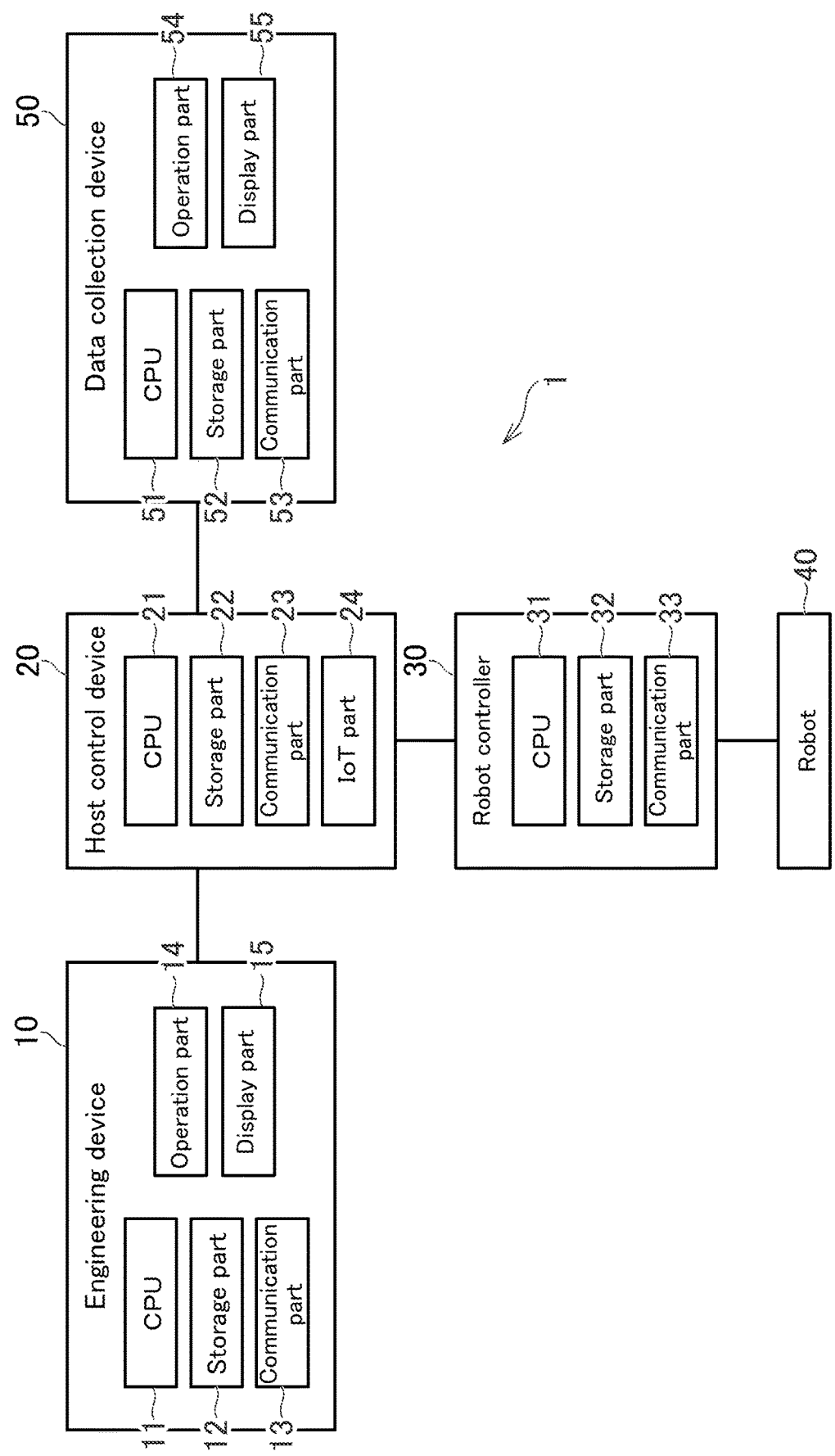
FIG. 1 illustrates an overall structure of a production system according to an embodiment of the present invention.

Embodiments will now be described with reference to the accompanying drawings, wherein like reference numerals designate corresponding or identical elements throughout the various drawings.

1. Overall Structure of Production System

In a production system in which a control device that controls at least one industrial device and a host control device that is capable of controlling the control device are communicably connected, command data is frequently transmitted or received between the host control device and the control device and communication cost is increased. A production system according to an embodiment of the present invention reduces the communication cost when the host control device causes the control device to execute various processes and is described in detail hereinafter.

FIG. 1 illustrates an example of an overall structure of a production system. As illustrated in FIG. 1, a production system 1 includes an engineering device 10, a host control device 20, a robot controller 30, a robot 40, and a data collection device 50. In FIG. 1, one engineering device 10, one host control device 20, one robot controller 30, one robot 40, and one data collection device 50 are illustrated. However, there may be multiple engineering devices 10, multiple host control devices 20, multiple robot controllers 30, multiple robots 40, and multiple data collection devices 50.

The devices included in the production system 1 can be connected to any network. In the present embodiment, a case is described where the devices are connected by a general network such as an Ethernet (registered trademark). However, the devices may be connected by a network for industrial devices. For example, it is possible that the devices are connected by different types of networks such as that the host control device 20, the engineering device 10 and the data collection device 50 are connected by a general network and the host control device 20 and the robot controller 30 are connected by a network for industrial devices.

The engineering device 10 is a computer that performs setting of the host control device 20 that is capable of controlling the robot controller 30 that controls at least one robot 40. For example, the engineering device 10 is a personal computer, a mobile phone (including a smartphone), or a mobile terminal (including a tablet terminal). The engineering device 10 may perform setting of devices other than the host control device 20.

In the engineering device 10, an engineering tool for assisting a user to perform setting work is installed. For example, the engineering tool is used for various purposes such as program creation, parameter setting, communication setting between devices, register definition, or variable definition. The engineering device 10 includes a CPU 11, a storage part 12, a communication part 13, an operation part 14, and a display part 15.

The CPU 11 includes at least one processor. The CPU 11 is a type of circuitry. The storage part 12 includes a RAM and a hard disk, and stores various programs or data. The CPU 11 executes various processes based on the programs or data. The communication part 13 includes communication interfaces such as network cards or various communication connectors, and communicates with other devices. The operation part 14 is an input device such as a mouse or a keyboard. The display part 15 is a liquid crystal display, an organic EL display, or the like, and displays various screens according to instructions of the CPU 11.

The host control device 20 is a computer that is capable of controlling other devices. The host control device 20 only needs to have a function of controlling other devices, but does not necessarily have to control the other devices. For example, it is possible that the host control device 20 only collects data from the robot controller 30 without controlling the robot controller 30. The entire production system 1 may be referred to as a cell, which is a unit smaller than a line, and in this case, the host control device 20 may be referred to as a cell controller. The host control device 20 may correspond to a kind of PLC (Programmable Logic Controller).

In the present embodiment, the host control device 20 is communicably connected to the robot controller 30 and is capable of controlling the robot controller 30. For example, the host control device 20 may be able to control multiple robot controllers 30. Further, for example, the host control device 20 may be able to control multiple devices of different types from each other. The number and types of devices to be controlled by the host control device 20 are not limited to the example of the present embodiment, and any number and any types of devices may be controlled.

The host control device 20 includes a CPU 21, a storage part 22, a communication part 23, and an IoT part 24. Physical structures of the CPU 21, the storage part 22, and the communication part 23 may be respectively the same as those of the CPU 11, the storage part 12, and the communication part 13. The IoT part 24 is a unit for transmit data to other computers via a network. For example, the IoT part 24 includes a CPU, a storage part, and a communication part. Physical structures of the CPU, the storage part, and the communication part included in the IoT part 24 may be respectively the same as those of the CPU 11, the storage part 12, and the communication part 13.

The CPU 21, the storage part 22, and the communication part 23 may be included in a first casing (hereinafter, referred to as the CPU unit) of the host control device 20, and the IoT part 24 may be included in a second casing (hereinafter, referred to as the IoT unit) of the host control device 20. In this case, the engineering device 10 can be connected to each of the CPU unit and the IoT unit. A user may connect the engineering device 10 to the CPU unit, or may connect the engineering device 10 to the IoT unit.

The robot controller 30 is a computer that controls the robot 40. The robot controller 30 is an example of a control device. Therefore, in the present embodiment, a part described as the robot controller 30 can be read as a control device. The control device may be any type of device as long as it is communicably connected to the host control device 20 and controls at least one industrial device. For example, the control device may be a PLC, a motion controller, a motor controller, an inverter, a converter, a machine tool, a carrying device, or a semiconductor manufacturing device. The control device is capable of controlling any number of industrial devices. The control device may control only one industrial device or may control multiple industrial devices. The control device corresponds to a higher-level device of an industrial device. The host control device 20 controls the control device, and thus, corresponds to a higher-level device of the control device.

The robot 40 is an industrial robot controlled by the robot controller 30. For example, the robot 40 includes a robot arm, a robot hand, a motor, and a sensor. The sensor may be a sensor that can detect a physical quantity, and is, for example, a motor encoder, a torque sensor, a motion sensor, a grip sensor, a vision sensor, or a temperature sensor. The robot 40 is an example of an industrial device. Therefore, in the present embodiment, a part described as the robot 40 can be read as an industrial device. An industrial device is a general term for a device that assists or acts on behalf of human work and its peripheral devices. For example, an industrial robot, a servo amplifier, or a motor corresponds to an industrial device. In a broad sense, the host control device 20, the robot controller 30, and sensors are also each a type of industrial device. Devices such as a PLC described above are also each a type of industrial device.

The data collection device 50 is a computer that collects data in the production system 1. The data collection device 50 is a personal computer, a server computer, a mobile phone (including a smartphone), or a mobile terminal (including a tablet terminal). The data collection device 50 includes a CPU 51, a storage part 52, a communication part 53, an operation part 54, and a display part 55. Physical structures of the CPU 51, the storage part 52, the communication part 53, the operation part 54, and the display part 55 may be respectively the same as those of the CPU 11, the storage part 12, the communication part 13, the operation part 14, and the display part 15.

Programs and data described as being stored in the devices may be supplied over a network. Further, the hardware structures of the devices are not limited to those of the above examples, and various hardware structures can be adopted. For example, a reading part (for example, an optical disk drive or a memory card slot) that reads a computer-readable information storage medium, or an input-output part (for example, a USB terminal) for directly connecting to an external device may be included. In this case, programs or data stored in the information storage medium may be supplied via the reading part or the input-output part.

Further, for example, an industrial device such as a robot directly controlled by the host control device 20 may be connected to the host control device 20. Further, for example, the host control device 20 and the robot controller 30 may each include a circuit called an FPGA or ASIC. Further, for example, the above-described sensor or input-output device or the like may be connected to each of the host control device 20 and the robot controller 30.

2. Overview of Production System

The host control device 20 of the present embodiment controls the robot controller 30 based on each of multiple variables. The variables are information referenced by a control program for controlling the robot controller 30. The control program may also rewrite the variables. For example, the variables indicate a calculation result in the middle, presence or absence of an alarm, or a physical quantity detected by a sensor (for example, a torque value detected by a torque sensor, or a rotation speed of a motor detected by a motor encoder).

For example, when the robot controller 30 executes multiple processes in a predetermined order, the execution order of the processes is described in the control program. The host control device 20 transmits instructions to the robot controller 30 based on the control program. The variable may become execution conditions of the processes. For example, the robot controller 30 stores a variable for starting a process, a variable for pausing a process, or a variable for ending a process. The variables may also be referred to as input-output variables.

A process is a work or an operation performed by the robot controller 30 using the robot 40. A process may consist of only one work or may consist of a combination of multiple works. A process may have any content according to an intended use of the robot controller 30, and is, for example, recognition of a workpiece, grasping of a workpiece, opening or closing of a door, setting of a workpiece, or processing using a machine tool. The robot controller 30 performs at least one process. The number of processes performed by the robot controller 30 may be any number, and the robot controller 30 may perform only one process or may perform multiple processes. The robot controller 30 performs a process based on an instruction received from the host control device 20 and a device program stored in the robot controller 30.

The device program is a program that defines an operation of the robot controller 30. The device program defines individual procedures of the processes. The device program can be created using any language corresponding to the robot controller 30, for example, the device program is created using a ladder language or a robot language or the like. In the present embodiment, a device program is prepared for each process. Therefore, when the robot controller 30 performs n processes (n is a natural number), the robot controller 30 stores at least n device programs.

The types of the variables are not limited to the above-described examples. For example, there may be a variable that indicates a command from the host control device 20 to the robot controller 30. Further, for example, there may be another variable that indicates start of execution of a command indicated by a certain variable. Further, for example, there may be a variable that indicates a name of a robot program to be executed by the robot controller 30 or an execution condition of the robot program. A robot program is a program to be executed by the robot controller 30. For example, the device program described above is a kind of robot program. A program referred to as a job is also a type of robot program. Further, for example, there may be a variable that indicates a response from the robot controller 30 to the host control device 20. Further, for example, there may be a variable that is not directly related to the control of the robot controller 30. A user operates the engineering device 10 to perform setting of the host control device 20 that stores the above-described variables. In the present embodiment, a part described as a user can be read as a user of the host control device 20. The user of the host control device 20 may be the same as a user of the robot controller 30 and a user of the data collection device 50. However, in the present embodiment, a case is described where these users are different from each other.

For example, a user uses the engineering tool installed on the engineering device 10 to perform register allocation of the host control device 20. The register allocation is performed as a part of communication setting between the host control device 20 and the robot controller 30. In the communication setting, setting of a port or an IP address to be used or the like is also performed. In the host control device 20, for each robot controller 30, a register range for controlling the robot controller 30 is allocated.

A register range is a band of register numbers. A register range includes multiple register numbers. The number of register numbers included in a register range may be any number. In the present embodiment, a case is described where the register numbers included in a register range are sequential numbers. However, it is also possible that the register numbers included in a register range are not sequential numbers. In a register included in a register range allocated to a device, a variable for controlling the device is stored and a variable for controlling other devices is not stored.

A register number is information identifying an individual register. A register number is a concept similar to an address, but strictly speaking, has a different meaning from an address. In the present embodiment, since a variable is stored in a register included in the CPU 21, a register number indicates an individual register of the CPU 21. For example, when a user specifies a leading register number, a range from the specified leading register number to a register number larger by a predetermined value is automatically specified as a register range.

A leading register number is the first register number in a register range allocated for controlling a device. An ending register number is the last register number in a register range allocated for controlling a device. In the present embodiment, since a register range includes sequential numbers, a register range for a certain device is from a leading register number to an ending register number specified for the device.

The ending register number is a number obtained by adding to the leading register number an offset of a size defined by structure data according to a communication profile. The communication profile is an interface that connects the host control device 20 and the robot controller 30. The communication profile may have the same meaning as a communication protocol, and a communication procedure or data format is defined. The structure data is stored in the storage part 12 of the engineering device 10 as a part of the engineering tool.

FIG. 2 illustrates a data storage example of the structure data. As illustrated in FIG. 2, the structure data (D1) is data in which a register system in the communication profile is defined. When multiple communication profiles are prepared, the structure data (D1) is prepared for each of the communication profiles. The structure data (D1) indicates a relationship between register numbers included in a register range and information stored in the register numbers. For example, the structure data (D1) stores offsets, tiers, and names.

An offset is a register number with the leading register number as a reference. It is also possible to say that an offset is a register number counted from the leading register number or is a relative register number with respect to the leading register number. In the data storage example in FIG. 2, the leading register number specified by a user corresponds to "No. 0000" which is the first offset number. The ending register number automatically set by the engineering tool corresponds to "No. 4259" which is the last offset number. In the present embodiment, a register range including a total of 4260 register numbers from "No. 0000" to "No. 4259" is allocated to the robot controller 30.

A tier is information indicating an attribute of a variable stored in a register corresponding to an offset. An attribute is information indicating a classification of variable. It is also possible to say that an attribute is information indicating a property or characteristic of a variable. When an attribute is expressed by a tier, for a lower tier, a more specific classification of a variable is expressed. In the data storage example in FIG. 2, there are four tiers. However the number of tiers may be arbitrary. An attribute does not have to have a concept of a tier.

A name is a name of a variable stored in a register corresponding to an offset. It is possible that a variable cannot be stored in a register corresponding to one register number depending on a data size of the variable. Therefore, such a variable is stored across multiple register numbers. For a variable having a larger data size, the number of register numbers required for the variable is larger. A name of the lowest tier of the first tier-fourth tier of each variable (for example, "CmdReqid" of "No. 2500") is also a type of name of the variable.

In the present embodiment, only main variables of the variables defined in the structure data (D1) are described. For example, a variable group of offsets "No. 0012"-"No. 2041" is the same data as reception data received by the host control device 20 from the robot controller 30. This variable group includes multiple answer headers including a command request ID of "No. 0413," a main command of "No. 0415," a subcommand of "No. 0416," a return value of "No. 0417," and an offset to additional data of "No. 0418."

The command request ID is an example of command request information. In the present embodiment, a part that describes the command request ID can be read as the command request information. The command request information is information for requesting the robot controller 30 to execute a command. For example, when the command request information is updated, a command is executed. Further, for example, when the command request information indicates a predetermined value, a command is executed. The command request information may be in any format other than an ID, and may be called by a name other than ID. The command request ID of the present embodiment is expressed by a numerical number and is incremented each time a command is executed.

The main command is information indicating a function requested of the robot controller 30 among multiple functions of the robot controller 30. In the present embodiment, three functions are prepared including a robot control function controlling the robot 40, a monitoring function monitoring an operation of the robot 40, and a collection function collecting data related to the operation of the robot 40, and the main command is a value indicating one of these functions. It is possible that the robot controller 30 does not have a monitoring function or a collection function, and has other functions. Further, the robot controller 30 may have only a single function. In this case, the main command can be omitted.

The subcommand is information indicating an operation requested of the robot controller 30 among multiple operations that can be executed by the robot controller 30. In the present embodiment, multiple operations are prepared for each function indicated by the main command. The subcommand indicates one of the multiple operations prepared for the function indicated by the main command. That is, in the present embodiment, a specific operation to be executed by the robot controller 30 is identified by a combination of a main command and a subcommand.

The return value is information indicating a result of an operation of the robot controller 30. For example, when the return value is a first value (for example, 0), the return value means that the operation has normally completed. Further, for example, when the return value is a second value (for example, 1), it means that an abnormality has occurred in the operation. The offset to additional data is information for identifying a register number in which the additional data included in response data from the robot controller 30 is stored. The additional data is added only for a predetermined combination of the main command and the subcommand.

Further, for example, the variable group of "No. 0012"-"No. 2041" includes an answer data area of "No. 0504"-"No. 1054" in addition to the above-described answer headers. Data such as additional data is stored in the answer data area.

Further, for example, a variable group of "No. 2042"-"No. 2499" is the same data as transmission data transmitted by the host control device 20 to the robot controller 30. This variable group includes a command request ID of "No. 2163," a main command of "No. 2165," a subcommand of "No. 2166," and a command data area of "No. 2167"-"No. 2499." Meanings of the command request ID, the main command, and the subcommand are as described above.

The command request ID, the main command and the subcommand of "No. 2163"-"No. 2166" are information transmitted to the robot controller 30. That is, this information is a kind of command with respect to the robot controller 30. The command request ID, the main command and the subcommand of "No. 0413"-"No. 0416" described above are information received from the robot controller 30. That is, this information is a kind of response from the robot controller 30. When the robot controller 30 is correctly operating, values of "No. 2163"-"No. 2166" match values of "No. 0413"-"No. 0416."

The command data area of "No. 2167"-"No. 2499" stores details of an operation requested of the robot controller 30. For example, in a case of a robot program selection command, a robot program name and a start portion of the robot program are stored in the command data area. In addition, data such as a parameter required in executing the robot program may be stored in the command data area. Further, for example, in a case of a power supply control command, data indicating whether to turn power supply on or off is stored in the command data area. The same applies to other commands, and when necessary, data indicating a detailed content of a command may be stored in the command data area.

A variable group of "No. 2500"-"No. 2950" corresponds to latest reception data received by the host control device 20 from the robot controller 30. For example, since the latest reception data is stored in "No. 0413"-"No. 0418" and "No. 0504" and after, the latest reception data is copied to "No. 2500"-"No. 2950." The variable group of "No. 2500"-"No. 2950" may correspond to reception data, and history of the reception data may be stored in "No. 0413"-"No. 2041." That is, a unit of the reception data may be the variable group of "No. 0413"-"No. 2041" or the variable group of "No. 2500"-"No. 2950."

Further, the structure data (D1) may include a register range for the monitoring function and a register range for the collection function. A variable for monitoring an operation of the robot 40 is stored in the register range for the monitoring function. A variable as a collection target of the data collection device 50 is stored in the register range for the collection function.

In the host control device 20 of the present embodiment, a register range corresponding to the structure data (D1) is allocated for each robot controller 30. For example, when the host control device 20 and k (k is a natural number) robot controllers 30 are connected, at least k register ranges are allocated in a register of the CPU 21 of the host control device 20. When communication profiles of the k robot controllers 30 are the same, the k register ranges are mutually the same system as shown in FIG. 2. However, since FIG. 2 illustrates merely register numbers of offsets, actual register numbers included in the k register ranges are set such that the actual register numbers are unique to each other.

Based on variables of register ranges that respectively correspond to the k robot controllers 30, the host control device 20 controls the robot controllers 30. In the present embodiment, since a specific process content is identified by a combination of a main command and a subcommand, the robot controller 30 identifies a specific process to be executed by the robot controller 30 itself based on a combination of a main command and a subcommand included in transmission data, and executes the process in response to an increment of a command request ID.

FIG. 3 illustrates a data storage example of command definition data in which a relationship between a combination of a main command and a subcommand and a process to be executed by the robot controller 30 is defined. The command definition data (D2) may be stored in the storage part 12 of the engineering device 10 as a part of the engineering tool.

In the example of FIG. 3, a main command of "1" means the robot control function. A main command of "2" means the monitoring function. A main command of "3" means the collection function. A subcommand indicating details of a process in each function is defined for each of the three main command values. A subcommand indicates a specific process content of a function indicated by a corresponding main command.

For example, in the case of the main command of the robot control function, subcommands for alarm reset, power control, robot program selection, mode switching, robot program execution, and robot operation toward a target position are respectively prepared. In the example of FIG. 3, specific contents of these are respectively indicated by values of the subcommands "1"-"6." The subcommands of the robot control function are not limited to those in the example of FIG. 3. For example, subcommands for hold stop, HMI lock, cycle change, robot operations specifying pulses of axes, and the like may be prepared. Further, for example, subcommands corresponding to commands such as MOVE and WAIT in a robot language may be prepared. Further, for example, a subcommand for executing a program (for example, a device program) larger than a robot program or a subcommand for maintenance such as parameter setting may be prepared.

Further, for example, in the case of the main command of the monitoring function, subcommands for reading monitor setting and reading robot program information are prepared. In the example of FIG. 3, specific contents of these are respectively indicated by values of the subcommands "1" and "2." The subcommands of the monitoring function are not limited to those in the example of FIG. 3. For example, subcommands for writing monitor setting and the like may be prepared.

Further, for example, in the case of the main command of the collection function, subcommands for reading collection setting and starting collection are prepared. In the example of FIG. 3, specific contents of these are respectively indicated by values of the subcommands "1" and "2." The subcommands of the collection function are not limited to those in the example of FIG. 3. For example, subcommands for writing collection setting, ending collection, and the like may be prepared.

As illustrated in FIG. 3, data stored in a command data area differs depending on a combination of a main command and a subcommand. Which register number is to be referred to in the command data area (what data is stored in which register number) is defined in advance in the command definition data (D2). The definition is stored in each of the host control device 20 and the robot controller 30.

For example, since "robot program selection" indicated by a combination of a main command "1" and a subcommand "3" needs to identify a robot program to be selected, a robot program name is stored in a register of a predetermined register number in the command data area. In the present embodiment, execution can be started from the middle of a robot program. When execution is started from the middle of a robot program, a start portion of the robot program is stored in the register of the predetermined register number in the command data area.

The start portion of the robot program is information for identifying a program code that starts execution among multiple program codes corresponding to the robot program. When the robot program is created using a ladder language, the start portion of the robot program is a line number. When the robot program is started from the beginning instead of in the middle, it is not necessary to write the start portion.

As described above, the host control device 20 of the present embodiment stores various command data sets such as a command request ID, a main command, and subcommands in a register range corresponding to the first tier "CommandData," and transmits these command data sets all at once. The robot controller 30 executes multiple command data sets received all at once. As a result, command data transmission and reception is no longer repeated many times between the host control device 20 and the robot controller 30, and communication cost is reduced. Details of the production system 1 are described below.

3. Functions Realized by Production System

Figure 4:
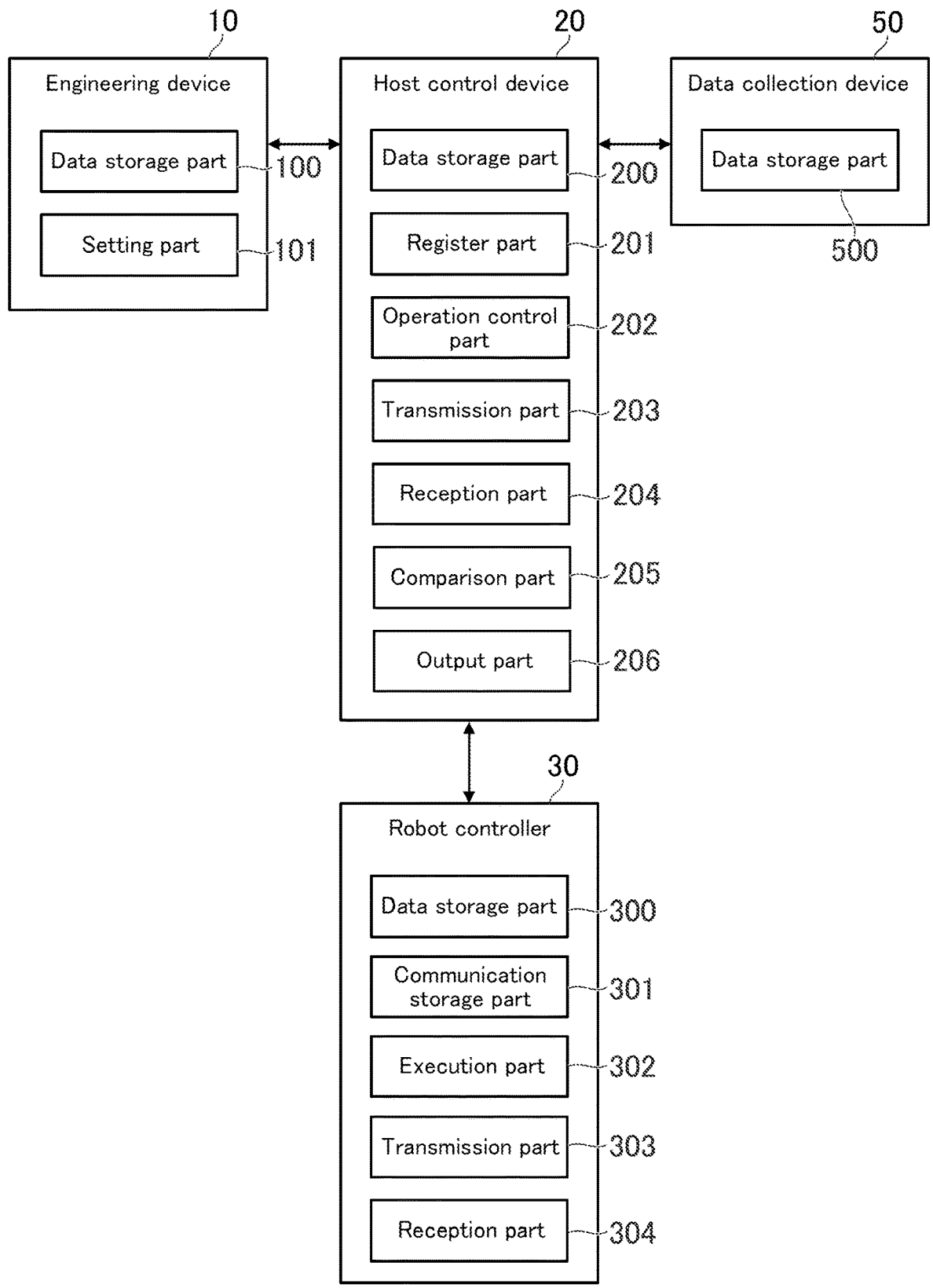
FIG. 4 is a functional block diagram illustrating functions realized by the production system.

FIG. 4 is a functional block diagram illustrating functions realized by the production system 1. In the present embodiment, functions respectively realized by the engineering device 10, the host control device 20, the robot controller 30, and the data collection device 50 are described.

3-1. Functions Realized by Engineering Device

As illustrated in FIG. 4, the engineering device 10 includes a data storage part 100 and a setting part 101. The data storage part 100 is mainly realized by the storage part 12, and the setting part 101 is mainly realized by the CPU 11.

Data Storage Part

The data storage part 100 stores data required for performing setting of the host control device 20. For example, the data storage part 100 stores the structure data (D1) and the command definition data (D2) described above. Further, for example, the data storage part 100 stores the engineering tool. Further, for example, the data storage part 100 may store a program or a parameter created by a user using the engineering tool. Further, for example, the data storage part 100 may store detailed definition data indicating a detailed definition of the communication setting. Information about a register range allocated to the robot controller 30, a local port used for communicating with the robot controller 30, a communication type, a port on the robot controller 30 side, an IP address of the robot controller 30, and the like is stored in the detailed definition data.

Setting Part

The setting part 101 executes a setting process of a device such as the host control device 20 based on an operation of a user. For example, based on a register number specified by a user, the setting part 101 allocates a register range to be used by the host control device 20 in controlling the robot controller 30. In this register range, a variable group is stored that is at least referenced or rewritten by a control program for controlling a corresponding robot controller 30. Allocating a register range means ensuring or reserving register numbers indicated by a register range corresponding to a certain robot controller 30 for controlling the robot controller 30. A register range allocated by an setting part is a storage area dedicated to control of a robot controller 30 corresponding to the register range. The setting part 101 allocates a register range by writing information about a register range stored in the detailed definition data to the data storage part 200 of the host control device 20. The setting part 101 also performs other setting such as IP address setting.

3-2. Functions Realized by Host Control Device

As illustrated in FIG. 4, the host control device 20 includes a data storage part 200, a register part 201, an operation control part 202, a transmission part 203, a reception part 204, a comparison part 205, and an output part 206. The data storage part 200 is mainly realized by the storage part 22. The register part 201, the operation control part 202, the transmission part 203, the reception part 204, the comparison part 205, and the output part 206 are each mainly realized by the CPU 21.

Data Storage Part

The data storage part 200 stores data for controlling the robot controller 30. For example, the data storage part 200 stores a control program and a parameter. Further, for example, the data storage part 200 may store other programs such as firmware, or may store a program for transmitting data to the data collection device 50. The operation control part 202 (to be described later) controls the robot controller 30 based on these programs and parameter. Further, for example, the data storage part 200 stores the detailed definition data indicating the details of the communication setting set by the engineering device 10. The detailed definition data indicates a register range allocated for controlling the robot controller 30. The detailed definition data is the same as that stored in the data storage part 100 of engineering device 10.

Register Part

The register part 201 includes registers that are respectively indicated by multiple register numbers. Variables for controlling the robot controller 30 are stored in a register range allocated by the setting part 101 in the registers included in the register part 201. A register identified by a register number is a unit of an individual storage element. In the present embodiment, a case is described where the register part 201 is a collection of multiple registers included in the CPU 21. However, the register part 201 may be a collection of multiple registers included in the storage part 22 or another information storage medium. The register part 201 may store variables other than the variables for controlling the robot controller 30.

FIG. 5 illustrates a data storage example of variables stored in the register part 201. In FIG. 5, the variables of the entire register range for controlling one robot controller 30 are indicated using a symbol D3. As illustrated in FIG. 5, the register part 201 stores values of variables in the registers that are respectively indicated by the multiple register numbers. In the example of FIG. 5, a leading address specified by a user is "GW05000," and the register range starts from this number. Since the structure data (D1) includes offsets as illustrated in FIG. 2, the register range for controlling the robot controller 30 is "No. GW05000"-"No. GW09259."

For example, the register part 201 includes a register that is allocated for controlling the robot controller 30 and includes a command area. The command area is an area for storing command data. The area is a storage area, and is a register indicated by at least one register number. In the case of the structure data (D1) of FIG. 2, the area of the first tier "CommandData" (an area of offsets "No. 2042"-"No. 2499," "No. GW07042"-"No. GW07499" in FIG. 5) is an example of the command area.

The command area is not limited to the above area. The command area may be any area as long as the area can store command data. For example, the area of the second tier "CmdRequest" (an area of offsets "No. 2163"-"No. 2499, "-"No. GW07163"-"No. GW07499" in FIG. 5) may correspond to a command area. Further, for example, the area of the third tier "CmdReqid"-"SubCmd" (an area of offsets "No. 2163"-"No. 2166,"-"No. GW07163"-"No. GW07166" in FIG. 5) may correspond to a command area.

The command data is a variable related to a command. The command is a command to the robot controller 30 by the host control device 20. In other words, the command is a process content instructed by the host control device 20. The command data may mean the command itself or may mean ancillary data required in executing the command. Multiple command data sets are stored in a command area. For example, one process content is identified by a combination of multiple command data sets. Further, for example, a process content and whether or not to start the process are identified by a combination of multiple commands. That is, the robot controller 30 is controlled by using multiple command data sets as one data set.

In the present embodiment, a command request ID, a main command, a subcommand, and data such as a robot program name or a start portion stored in a command data area each correspond to a command data set. When all of these are used, four command data sets are transmitted to the robot controller 30. The number of command data sets transmitted all at once is not limited to four. 2, 3 or 5 or more command data sets may be transmitted all at once. A command area may store at least the number of command data sets to be transmitted. For example, command data, such as a command request ID, a main command, or a subcommand, may be indicated using a numerical number. Further, for example, command data, such as a robot program name, may be indicated using a character string.

For example, the register part 201 includes a response area in which response data received from the robot controller 30 is written. The response area is an area for storing the response data. In the case of the structure data (D1) of FIG. 2, the area of the first tier "ResponsData" (an area of offsets "No. 0012"-"No. 2041," "No. GW05012"-"No. GW07041" in FIG. 5) is an example of the response area.

The response area is not limited to the above area. The response area may be any area as long as the area can store a part of or the entire response data. For example, the area of the second tier "CmdAnswer" (an area of offsets "No. 0413"-"No. 1054," "No. GW05413"-"No. GW06054" in FIG. 5) may correspond to a response area. Further, for example, the area of the first tier "CmdAnsWork" (an area of offsets "No. 2500"-"No. 2950," "No. GW07500"-"No. GW07950" in FIG. 5) may correspond to a response area.

The response data is data that indicates an execution result of a command. In the present embodiment, when multiple command data sets are regarded as one command, the response data is data corresponding to a response to the command. For example, the response data includes information that allows a process executed by the robot controller 30 to be identified. In the present embodiment, the response data includes a command request ID, a main command, a subcommand, and a return value. The command request ID included in the response data is a command request ID when the main command and the subcommand are executed. The main command and the subcommand included in the response data are those actually executed by the robot controller 30. The return value is a value that indicates whether or not the process identified by the main command and the subcommand has normally completed. The response data is not limited to these, and may store any information. For example, when necessary, the response data may store additional data that indicates details of a process result.

Operation Control Part

The operation control part 202 controls an operation of the robot controller 30 based on multiple variables and a control program. For example, the operation control part 202 writes multiple command data sets for requesting execution of a process to a command area by executing a control program for controlling the robot controller 30. In the control program, values of multiple command data sets are defined.

For example, in the case of the robot program selection illustrated in FIG. 3, "1" is stored in the main command area, "3" is stored in the subcommand area, and a predetermined robot program name is stored in the command data area (a start portion is also stored when necessary), and that the command request ID is incremented is defined in the control program. Similarly for other processes, in the control program, after predetermined values are respectively stored at least in the main command area and the subcommand area, that the command request ID is incremented is defined. It is also possible to store values of other areas after the command request ID is incremented. However, in this case, when transmission data is transmitted before the values in the other areas are changed, the robot controller 30 may malfunction. Therefore, in the present embodiment, the above order is adopted.

The operation control part 202 writes a command with respect to the robot controller 30 to a register included in a register range corresponding to the robot controller 30. The operation control part 202 refers to the detailed definition data recorded in the data storage part 200, identifies which robot controller 30 corresponds to which register range, and writes a command to a register included in the identified register range. The command written in the register is transmitted to the robot controller 30 by the operation control part 202.

Here, the process of the operation control part 202 is described by taking as an example the process in the case where the robot controller 30 executes a robot program. In the present embodiment, a case is described where the selection of the robot program and the execution of the robot program are prepared as separate commands. However, these may be combined as one command. That is, the robot program may be executed immediately after the robot program is selected.

FIG. 6 illustrates an example of values of variables when a robot program is selected and executed. Here, a case is described where the register range as illustrated in FIG. 5 is allocated. That is, "No. GW05000"-"No. GW09259" are allocated as the register range corresponding to the robot controller 30. FIG. 6 illustrates changes in multiple command data sets (a command request ID, a main command, a subcommand, and data in a command data area) written in a command area in this register range. In the example of FIG. 6, in the command area before the execution of the control program, as an initial state, the command request ID is "0" and no data is stored in the area.

When the operation control part 202 starts the execution of the control program (for example, when a coil described at the beginning of a ladder program is turned on), in order to cause the robot controller 30 to select a robot program, a value (for example, 1) indicating the robot control function is written to the register of "No. GW07165" as the main command. The operation control part 202 writes a value (for example, 3) indicating robot program selection to the register of "No. GW07166" as the subcommand.

The operation control part 202 writes the robot program name and the start portion of the robot program to some registers of "No. GW07167"-"No. GW07499." The start portion of the robot program is information for identifying a program code that starts execution among multiple program codes corresponding to the robot program. When the robot program is created using a ladder language, the start portion of the robot program is a line number. When the robot program is started from the beginning instead of in the middle, it is not necessary to write the start portion. After finishing the above writing, the operation control part 202 increments the command request ID of "No. GW07163" in order to cause the robot controller 30 to select a robot program. As illustrated in FIG. 6, the command request ID changes from "0" to "1."

As a result, the process for selecting a robot program is completed. The transmission part 203 of the host control device 20 transmits transmission data corresponding to the registers of "No. GW07042"-"No. GW07499." A reception part 304 of the robot controller 30 receives the transmission data and writes the transmission data to a communication storage part 301 (to be described later). The execution part 302 of the robot controller 30 refers to the communication storage part 301 and determines whether or not the command request ID has been incremented. Here, since the command request ID has been incremented from "0" to "1," the execution part 302 executes the main command and the subcommand written in the communication storage part 301, and reads a robot program indicated by the robot program name written in the communication storage part 301. When a start portion is specified, the execution part 302 reads the robot program after the start portion. The read robot program is expanded in the data storage part 300 or the communication storage part 301. At this point, the robot read program is not yet executed. When robot program execution (to be described later) is performed, the read robot program is executed.

The execution part 302 writes response data indicating an execution result of the main command and the subcommand in the communication storage part 301. A transmission part 303 transmits the response data written in the communication storage part 301 to the host control device 20. This response data is in the same format as "No. 0012"-"No. 2041" illustrated in FIG. 2. For example, the transmission part 303 transmits response data including the command request ID corresponding to the command executed, the main command and the subcommand, and a return value indicating that the command has been normally executed. When the command is not normally executed, a return value to that effect is included in the response data.

When the response data is received, the reception part 204 of the host control device 20 writes the response data to the response area of the register part 201. The comparison part 205 (to be described later) determines whether or not the command request ID, the main command and the subcommand (that is, the variables of "No. G07163"-"No. G07166") included in the transmitted transmission data match the command request ID, the main command and the subcommand (that is, the variables of "No. G05413"-"No. G05416" or "No. G07500"-"No. G07503") included in the response data. Further, the comparison part 205 determines whether or not the return value included in the response data indicates a normal value. When all of these determinations are positive, the next process is executed. When any of these determinations is negative, the output part 206 (to be described later) outputs an alert. In this case, the operation control part 202 stops the execution of the control program.

The control program describes a process in which the selected robot program is executed as the next process. As illustrated in FIG. 6, the operation control part 202 writes a value (for example, 1) indicating the robot control function in the register of "No. GW07165" as the main command in order to cause the robot controller 30 to execute the robot program. The operation control part 202 writes a value (for example, 5) indicating robot program execution to the register of "No. GW07166" as the subcommand. The operation control part 202 increments the command request ID of "No. GW07163." The command request ID changes from "1" to "2." In the case of the robot program execution, nothing is written to the register of "No. GW07167"-"No. GW07499."

As a result, the process for executing the robot program is completed. The transmission part 203 transmits the transmission data corresponding to the registers of "No. GW07042"-"No. GW07499." In the same way as the flow described above, the execution part 302 of the robot controller 30 detects that the command request ID has been incremented, and executes the main command and the subcommand. Since the robot program has already been read by the previous main command and subcommand, the execution part 302 executes the read robot program. When a start portion of the robot program is specified, the execution part 302 executes the robot program from the specified start portion. When the robot program is executed, in the same way as the flow described above, response data is transmitted and whether or not the robot program has been normally executed is determined.

A method for controlling the robot controller 30 is not limited to that of the above example. The operation control part 202 may control the robot controller 30 without using a main command and a subcommand. For example, the operation control part 202 may control a robot controller 30 by writing a command request ID and one command to a register in a register range corresponding to the robot controller 30. Further, for example, when a variable as a start condition of a device program of a robot controller 30 is stored in a register in a register range corresponding to the robot controller 30, the operation control part 202 may instruct the robot controller 30 to start executing the device program by rewriting a value of the variable.

Further, the operation control part 202 may match some or all of variables stored in the register part 201 with some or all of variables stored in the communication storage part 301. The matching of these may be performed periodically or non-periodically. For example, the operation control part 202 transmits, to a robot controller 30, transmission data including all or some of the variables in a register range corresponding to the robot controller 30 in the register part 201. Further, for example, the operation control part 202 records response data received from a robot controller 30 in a register range corresponding to the robot controller 30 in the register part 201. By these processes, all or some of the variables are matched.

As described above, the operation control part 202 writes a command for requesting robot program selection and a robot program name as multiple command data sets in a command area. In the present embodiment, this command is a combination of a main command indicating "1" and a subcommand indicating "3." The robot program name is a character string defined in the control program. The operation control part 202 stores the robot program name defined in the control program in a predetermined area of the command data area.

For example, the operation control part 202 may further write start portion information about a start portion in the robot program as command data in the command area. The start portion information is defined in the control program. The operation control part 202 writes the start portion information (for example, a line number in a ladder program) defined in the control program to the command area. When the robot program is executed from the beginning without specifying a start portion, no start portion information is written.

After the command and the robot program name are transmitted, the operation control part 202 writes new command data in the command area requesting the start of the robot program. In the present embodiment, this new command data is a combination of a main command indicating "1" and a subcommand indicating "5." As described above, nothing is stored in the command data area. However, some data may be stored in the command data area.

The operation control part 202 writes a command request ID requesting command execution and a command as multiple command data sets in the command area. In the present embodiment, a case is described where this command is a combination of a main command and a subcommand. However, this command may be a single command or a combination of three or more commands.

In the present embodiment, the robot controller 30 has multiple functions, and the operation control part 202 writes as multiple command data sets in the command area a main command that requests one of the multiple functions and a subcommand that requests a process of that function. In the above example, the robot control function is taken as an example. When the monitoring function or the collection function is required, the operation control part 202 may write a main command of "2" or "3."

The operation control part 202 further writes detailed information about details of a process as command data in an area corresponding to the combination of the main command and the subcommand in the command area. The detailed information is information stored in the command data area. In the present embodiment, robot program a part that describes the robot program name or the start portion information can be read as the detailed information. As mentioned above, the relationship between the combination of the main command and the subcommand and the part of the command area where the detailed information is stored is defined in advance in the command definition data (D2). By referring to this relationship, the operation control part 202 can identify which part of the command area is to be referred to for acquiring the detailed information.

Transmission Part

The transmission part 203 transmits any data to the robot controller 30. For example, the transmission part 203 transmits multiple command data sets written in a command area to a corresponding robot controller 30. The corresponding robot controller 30 is a robot controller 30 corresponding to a register range that includes the command area. When new command data is written in the command area, the transmission part 203 transmits the new command data to the corresponding robot controller 30.

In the present embodiment, since writing to the command area is performed by executing a control program, the transmission part 203 transmits multiple command data sets written to the command area by executing the control program. The transmission part 203 transmits transmission data including multiple command data sets at any timing after the writing to the command area is completed. In the present embodiment, a case is described where data other than command data is also included in the transmission data. However, it is also possible that only multiple command data sets are included in the transmission data. In the present embodiment, the transmission part 203 transmits multiple command data sets all at once as one transmission data set. That is, the multiple command data sets are combined in one data frame.

Further, in the present embodiment, the host control device 20 and the robot controller 30 are connected by an asynchronous communication network. For example, the host control device 20 and the robot controller 30 are connected by a general network such as an Ethernet (registered trademark). Further, for example, data transmission and reception may be periodically performed between the host control device 20 and the robot controller 30.

Synchronous communication is a communication method in which a timing at which a transmitting device transmits data and a timing at which a receiving device receives data are matched with each other. In synchronous communication, in principle, no other processes are executed from when a data communication request is transmitted to when a response is received. Therefore, after transmitting data to the receiving device, the transmitting device waits for a response. When data is received from the transmitting device, the receiving device immediately executes a process and returns a process result as a response to the transmitting device. When the process result is received, the transmitting device proceeds to the next process. When synchronous communication is not performed, communication is performed using asynchronous communication. The host control device 20 and the robot controller 30 may be connected by a synchronous communication network.

Asynchronous communication is a communication method in which communication is performed without matching the timing at which the transmitting device transmits data and the timing at which the receiving device receives data. In asynchronous communication, other processes can be executed from when a data communication request is transmitted to when a response is received. Therefore, in asynchronous communication, the transmitting device can execute other processes from when data is transmitted to the receiving device to when a response is received. Further, in asynchronous communication, the receiving device does not always immediately execute a process even when data is received from the transmitting device. The receiving device waits for execution of a process until a predetermined condition is met, or executes a synchronous communication process with a higher priority. The transmission part 203 uses asynchronous communication to transmit multiple command data sets.

Reception Part

The reception part 204 receives any data from the robot controller 30. For example, the reception part 204 receives response data transmitted by the robot controller 30 in response to execution of a command. Upon receiving the response data, the reception part 204 stores the response data in a register of a predetermined register number. In the present embodiment, the response data is stored in registers of offsets "No. 0012"-"No. 2041."

Comparison Part

The comparison part 205 compares multiple transmitted command data sets with response data. The comparison part 205 determines whether or not all or some of these data sets match. In the present embodiment, the comparison part 205 determines whether or not the command request ID, the main command and the subcommand included in the multiple transmitted command data sets match the command request ID, the main command and the subcommand included in the response data. The comparison part 205 may perform other determinations, for example, may determine whether or not a return value included in the response data is a predetermined value. Further, for example, the comparison part 205 may determine whether or not additional data is included in the response data.

Output Part

The output part 206 outputs a predetermined alert based on a comparison result of the comparison part 205. An alert may be output in a human-perceptible manner, for example, visually, audibly, or tactilely. For example, the output part 206 outputs an alert by displaying a predetermined image on a display part connected to the host control device 20. This image may be an error message or an icon. Further, for example, the output part 206 may output an alert by blinking a screen.

The output part 206 does not output an alert when matching is determined by the comparison part 205, and outputs an alert when matching is not determined by the comparison part 205. An alert may be output by a voice from a speaker, vibration of a vibrator, or blinking of an LED light. Further, an alert may also be output by other methods such as sending an email. Further, in the present embodiment, comparison is performed by the comparison part 205 regarding three items including a command request ID, a main command, and a subcommand, and the output part 206 outputs an alert when mismatch is found regarding any one of the items. The output part 206 may output an alert when the number of items for which mismatch is found exceeds a threshold (for example, 2).

3-3. Functions Realized by Robot Controller

As illustrated in FIG. 4, the robot controller 30 includes the data storage part 300, the communication storage part 301, the execution part 302, the transmission part 303, and the reception part 304. The data storage part 300 is mainly realized by the storage part 32. The communication storage part 301, the execution part 302, the transmission part 303, and the reception part 304 are mainly realized by a CPU 31.

Data Storage Part

The data storage part 300 stores data required for the robot controller 30 to perform a predetermined operation. For example, the data storage part 300 stores a device program or a parameter. Further, for example, the data storage part 300 stores a program of a robot program that is not included in a device program.

Communication Storage Part

The communication storage part 301 stores multiple variables indicating contents of communication with the host control device 20. In the present embodiment, a case is described where the communication storage part 301 is realized by a register in the CPU 31. However, it is also possible that the data storage part 300 stores multiple variables without separating the data storage part 300 and the communication storage part 301. A register system of the communication storage part 301 is predefined. That is, which data is written to which register number is predetermined. In principle, this register system is fixed and cannot be changed. However, this register system may be changed by the engineering tool.

For example, the communication storage part 301 stores transmission data transmitted by the host control device 20. The communication storage part 301 stores multiple variables received from the host control device 20. For example, the communication storage part 301 stores a variable included in reception data received from the host control device 20. This variable has the same value as that of a variable stored in the register part 201. The communication storage part 301 may store other variables. The data storage part 300 may store multiple variables without separating the data storage part 300 and the communication storage part 301.

In the present embodiment, multiple command data sets received from the host control device 20 are written in the communication storage part 301. That is, when multiple command data sets written in a command area of a register of the host control device 20 allocated for controlling the robot controller 30 are received, the multiple command data sets are written in the communication storage part 301. Further, for example, the communication storage part 301 stores response data to be transmitted by the robot controller 30. Response data indicating an execution result of a process is written in the communication storage part 301.

Execution Part

The execution part 302 executes a process instructed by the host control device 20 based on multiple command data sets written in the communication storage part 301. The execution part 302 identifies a process content based on multiple command data sets, and executes a process of the identified process content. A relationship between the multiple command data sets and the process content is stored in advance in the data storage part 300. This relationship may be the same data as the command definition data (D2) in FIG. 3.

The process executed by the execution part 302 may be any process. The execution part 302 can execute a process according to the various commands described above. For example, the process is a process of a robot program. The robot program may correspond to an operation unit in a device program. The robot controller 30 of the present embodiment can execute multiple robot programs, and the execution part 302 selects a robot program of a robot program name based on a command, and executes the selected robot program.

In the present embodiment, after a robot program is selected, new command data is transmitted and execution of the robot program is instructed. Therefore, the execution part 302 starts executing the selected robot program based on the new command data. The execution part 302 starts executing the selected robot program when new command data (in the present embodiment, data in which a main command is "1" and a subcommand is "5") indicating the execution of the robot program is recorded in communication storage part 301.

Further, in the present embodiment, since a start portion for starting execution of a robot program can be specified, the execution part 302 identifies a start portion in an identified robot program based on start portion information, and executes the identified robot program from the identified start portion. For example, when a line number of a robot program is specified as a start portion, the execution part 302 starts execution of the robot program from the line number specified as the start portion.

Further, in the present embodiment, the execution part 302 executes a process based on a command when the command request ID is updated. The execution part 302 refers to the command request ID stored in the communication storage part 301 and determines whether or not the command request ID has been updated. When it is not determined that the command request ID has been updated, the execution part 302 does not execute the process determined according to the main command and the subcommand even when at least one of the main command and the subcommand has been updated. When it is determined that the command request ID has been updated, the execution part 302 executes the process determined according to the main command and the subcommand. It is assumed that the latest command request ID is held in the communication storage part 301.

Further, in the present embodiment, the execution part 302 identifies and executes a process based on a combination of a main command and a subcommand. A relationship between the combination of the main command and the subcommand and the process content to be executed is defined in advance. This definition may be defined in a device program, or may be stored in the data storage part 300 by preparing a separate definition file. The execution part 302 may execute a device program when the execution part 302 detects that a variable that is a start condition of the device program has reached a predetermined value.

The execution part 302 executes a process based on detailed information written in an area corresponding to a combination of a main command and a subcommand. This area is a command data area. The detailed information is information written in the command data area. A relationship between the combination of the main command and the subcommand and the area where the detailed information is written is defined in advance. This definition may be defined in a device program, or may be stored in the data storage part 300 by preparing a separate definition file.

Multiple command data sets of the present embodiment include a command for executing a robot program, a robot program name of the robot program, and start portion information about a start portion of the robot program in the robot program, and, upon receiving the command, the execution part 302 identifies a robot program and a start portion based on the robot program name and the start portion information, and executes the identified robot program from the identified start portion. A flow in which the robot program and the starting portion are identified is as described with reference to FIG. 6.

Transmission Part

The transmission part 303 transmits the response data written in the communication storage part 301 to the host control device 20. As described above, the response data is generated by the execution part 302 and is written to the communication storage part 301. When the writing of the response data to the communication storage part 301 is completed, the transmission part 303 transmits the response data to the host control device 20. The transmission part 303 may periodically transmit the response data written in the communication storage part 301. In this case, periodic communication is performed between the host control device 20 and the robot controller 30.

Reception Part

The reception part 304 receives transmission data from the host control device 20. The reception part 304 records the transmission data in the communication storage part 301. In the present embodiment, since asynchronous communication is performed between the host control device 20 and the robot controller 30 and the transmitted data is transmitted or received non-periodically, the reception part 304 receives the transmission data non-periodically. The response data is also transmitted or received non-periodically.

When synchronous communication is performed between the host control device 20 and the robot controller 30, the transmission data and the response data may be transmitted or received periodically. In this case, the synchronous communication is performed at predetermined intervals, and matching between the variables of the register part 201 and the variables of the communication storage part 301 are periodically performed.

3-4. Functions Realized by Data Collection Device

As illustrated in FIG. 4, the data collection device 50 includes a data storage part 500. The data storage part 500 is mainly realized by the storage part 52. The data storage part 500 stores collected data in which variables collected from the host control device 20 are stored. The collected data is data in which values of variables specified as collection targets are stored. The collected data may store values of the variables at a certain point in time, or may store changes over time in the values of the variables. Further, the collected data may store a value of only one variable or values of multiple variables. Further, for example, the data storage part 500 may store an analysis program of the collected data.

4. Process Executed by Production System

Figure 7:
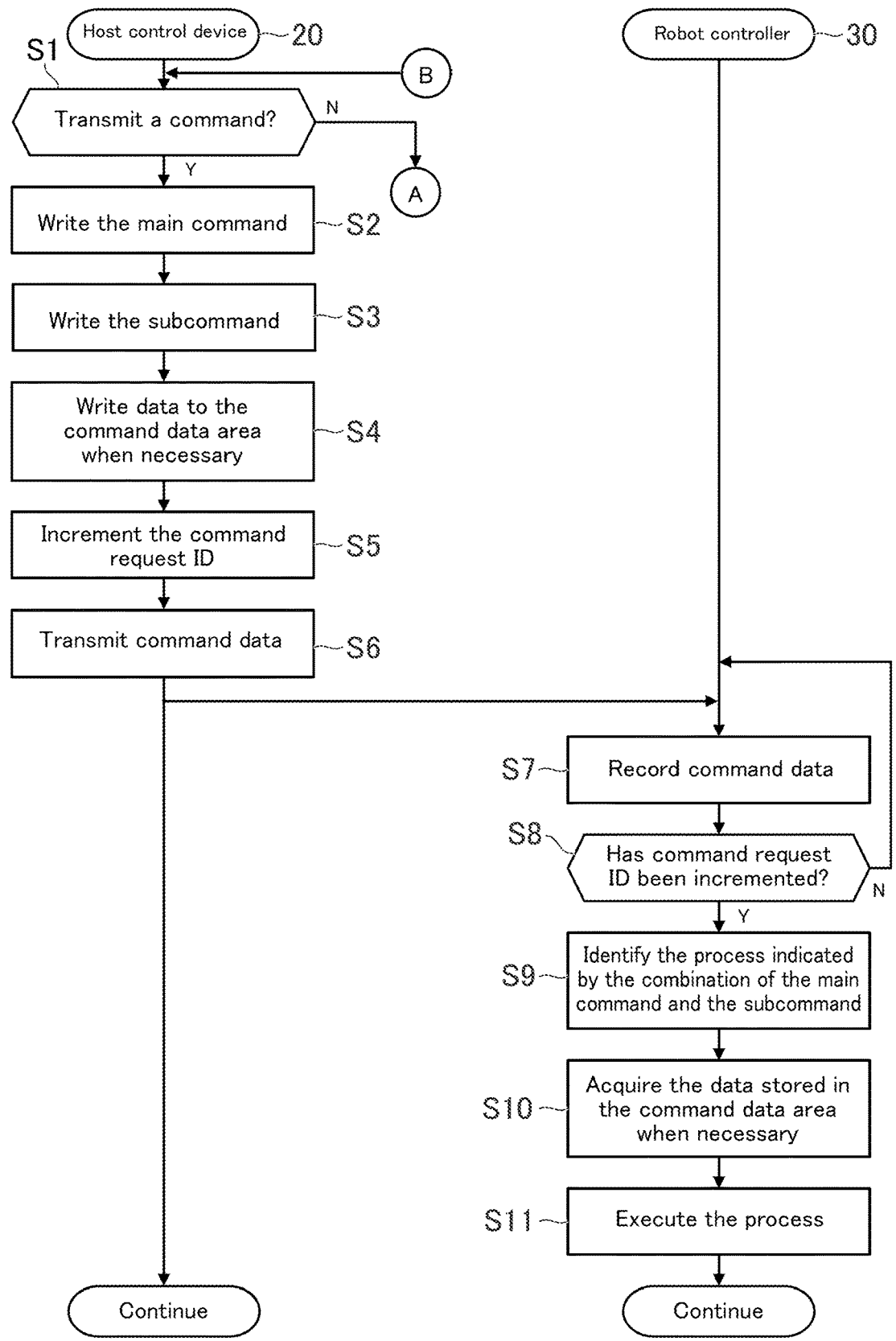
FIG. 7 is a flow diagram illustrating an example of a process executed by the production system of the embodiment.
Figure 8:
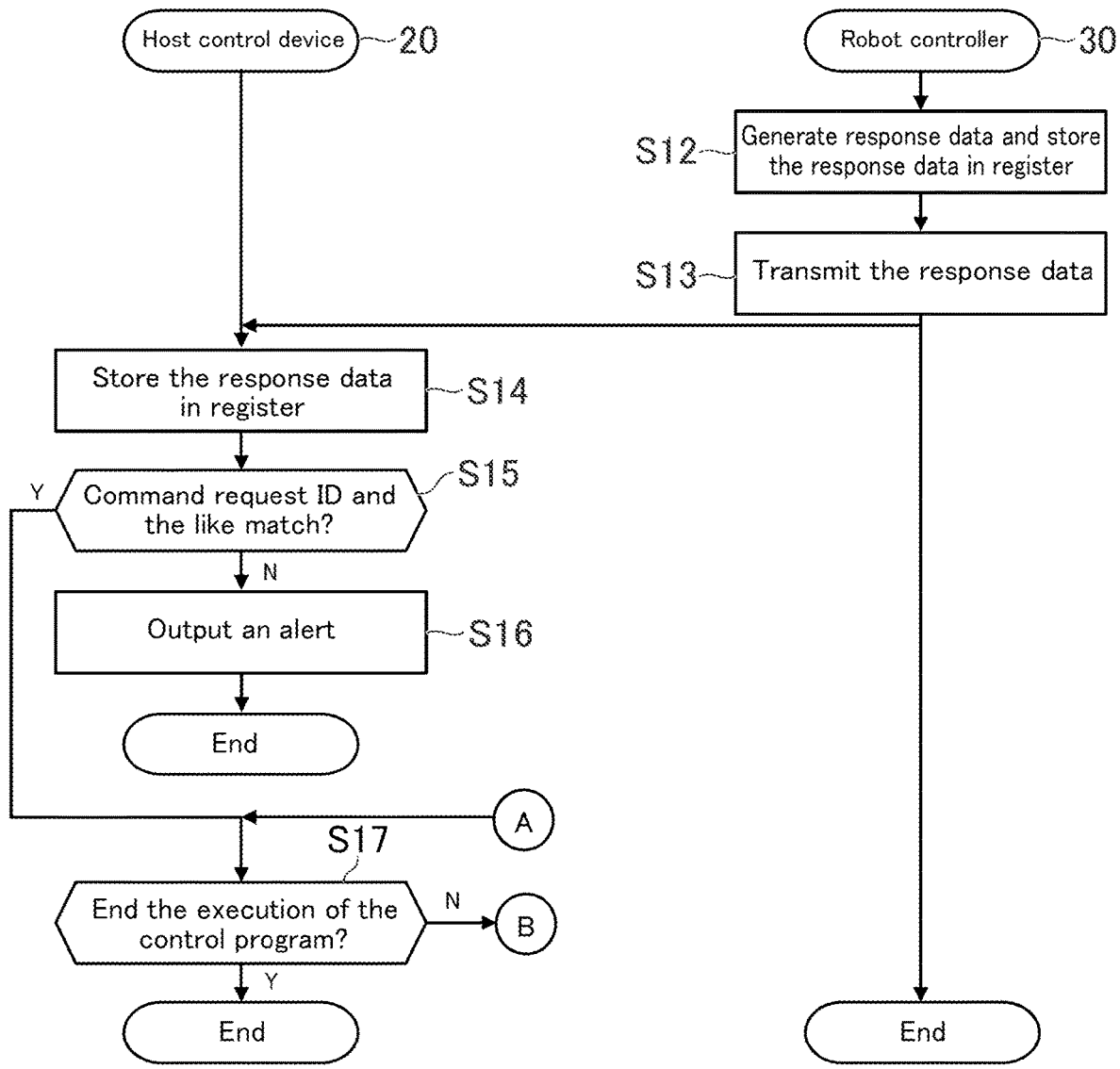
FIG. 8 is a flow diagram illustrating an example of a process executed by the production system of the embodiment.

FIGS. 7 and 8 are flow diagrams illustrating an example of the process executed by the production system 1 of the embodiment. In the present embodiment, of the process executed by the production system 1, a communication process between the host control device 20 and the robot controller 30 is described. The CPU 21 executes the control program stored in the storage part 22, and the CPU 31 executes the device program stored in the storage part 32, and thereby, the process illustrated in FIGS. 7 and 8 is executed. The process illustrated in FIGS. 7 and 8 is an example of the process executed by the functional blocks illustrated in FIG. 4.

As illustrated in FIG. 7, the host control device 20 determines whether or not a command is to be transmitted to the robot controller 30 based on the control program (S1). For example, when the control program is described using a ladder chart, a coil that is a condition for starting the execution of the control program is defined. The host control device 20 determines whether or not this condition is met. This condition may be that a particular variable has a predetermined value. When it is determined that this condition is met, it is determined that the command is to be transmitted.

When it is not determined that the command is to be transmitted (S1: N), the process proceeds to S17 (to be described later). When it is determined that the command is to be transmitted (S1; Y), the host control device 20 writes a main command of a value identified by the control program to the register of "No. GW07165" among the registers of the CPU 21 (S2). The host control device 20 writes a subcommand of a value identified by the control program to the register of "No. GW07166" among the registers of the CPU 21 (S3). The host control device 20 writes data to registers in a command data area of "No. GW07167" and after among the registers of the CPU 21 when necessary (S4). It is assumed that the values to be written in the process of S2-S4 are defined in the control program. When it is not necessary to write the data, the process of S4 is not executed.

The host control device 20 increments a command request ID of "No. GW07163" among the registers of the CPU 21 (S5). The host control device 20 transmits multiple command data sets stored in the registers of "No. GW07163"-"No. GW07499" among the registers of the CPU 21 to the robot controller 30 (S6).

The robot controller 30 receives the multiple command data sets and records the multiple command data sets in the registers of the CPU 31 (S7). The robot controller 30 determines whether or not the command request ID has been incremented based on the multiple command data sets recorded in the registers (S8). In S8, the robot controller 30 compares the value of the command request ID stored up to that point with the value of the command request ID included in the multiple command data sets recorded in S7.

When it is determined that the command request ID has been incremented (S8: Y), the robot controller 30 identifies the process indicated by the combination of the main command and the subcommand recorded in the registers of the CPU 31 (S9). The robot controller 30 acquires the data stored in the command data area of the CPU 31 when necessary (S10), and executes the process identified in S9 (S11).

Moving to FIG. 8, the robot controller 30 generates response data based on the execution result of the process of S11 and stores the response data in the registers of the CPU 31 (S12). When the process of S11 is normally executed, the same command request ID, main command and subcommand received in S7 are stored in the response data. The robot controller 30 transmits the response data stored in the registers of the CPU 31 to the host control device 20 (S13).

The host control device 20 receives the response data and stores the response data in the registers of the CPU 21 (S14). The host control device 20 determines whether or not the command request ID and the like included in the response data match the command request ID and the like included in the transmission data (S15). When it is not determined that they match each other (S15: N), the host control device 20 outputs a predetermined alert (S16), and the present process ends.

When it is determined in S15 that the command request ID and the like match (S15: Y), the host control device 20 determines whether or not the execution of the control program is to be ended (S17). In S17, whether or not the control program has been executed to an end of a code portion is determined. When it is not determined that the execution of the control program is to be ended (S17: N), the process returns to the process of S1 and the execution of the control program is continued. When it is determined that the execution of the control program is to be ended (S17: Y), the present process ends.

According to the production system 1 described above, multiple command data sets written in a command area of registers allocated for controlling the robot controller 30 are transmitted to the robot controller 30. By identifying the process specified by the host control device 20 based on the multiple command data sets, it is no longer necessary to transmit command data to the robot controller 30 many times in order to execute various processes, and communication cost can be reduced. The robot controller 30 can identify the process specified by the host control device 20 by simply referring to the multiple command data sets written in the communication storage part 301. Further, by using a combination of multiple command data sets instead of simply transmitting one command data set to execute a process, a larger number of processes can be handled while saving resources such as memories.

Further, in the production system 1, the robot controller 30 is allowed to execute any robot program selected from multiple robot programs by simply rewriting a command in a command area and a robot program name, and thus, communication cost when various robot programs are executed can be reduced.

Further, in the production system 1, after a robot program selection subcommand is transmitted, a robot program start subcommand is written in a command area and is transmitted, and execution of a selected robot program is started. Thereby, the timing to start the execution of the robot program can be controlled on the host control device 20 side.

Further, in the production system 1, a robot program can be executed from any portion of the robot program by writing the start portion information in the command area. By executing the robot program from the middle instead of executing the robot program from the beginning, it is no longer necessary to cause the robot controller 30 to execute an unnecessary process. As a result, a processing load of the robot controller 30 can be reduced. Further, it is possible to prevent occurrence of wasted time before a desired process is executed.

Further, in the production system 1, a command is executed when the command request information is updated. Thereby, the execution timing of the command can be controlled. For example, even when a command is stored in the command area even though it is not the timing for executing the command, when the command request information has not been updated, the command can be prevented from being executed, and the command can be prevented from being executed by mistake.

Further, in the production system 1, any one of multiple functions of the robot controller 30 is requested with a main command, and a specific process in that function is requested with a subcommand, and a process is identified and executed based on the combination of the main command and the subcommand, and thereby, a command system can be simplified. Since various processes can be handled by combining the main command and the subcommand that can be transmitted all at once, communication cost can be reduced.

Further, in the production system 1, the command area can be effectively used by specifying details of a process content based on the detailed information written in the area corresponding to the combination of the main command and the subcommand. For example, instead of providing a separate area for writing detailed information for each combination of a main command and a subcommand, a shared area is provided. As a result, a size of a register to be secured and a size of transmission data can be prevented from increasing, and memory consumption and communication cost can be reduced.

Further, in the production system 1, the host control device 20 executes a control program, and thereby, a process to be executed by the robot controller 30 can be specified and the process can be executed by the robot controller 30. Variation in controlling the robot controller 30 by the host control device 20 can be increased without increasing communication cost.

Further, in the production system 1, even when the host control device 20 and the robot controller 30 are connected by asynchronous communication, by transmitting multiple command data sets, advanced control of the robot controller 30 is enabled.

Further, in the production system 1, response data indicating a result of a process executed by the robot controller 30 is written in a response area, and thereby, whether or not a process instructed to the robot controller 30 has been correctly executed can be identified.

Further, in the production system 1, by comparing multiple command data sets with response data, whether or not a process instructed by the host control device 20 has been correctly executed can be confirmed.

Further, in the production system 1, a robot program can be executed from any portion of the robot program. By executing the robot program from the middle instead of executing the robot program from the beginning, it is no longer necessary to cause the robot controller 30 to execute an unnecessary process. As a result, a processing load of the robot controller 30 can be reduced. Further, it is possible to prevent occurrence of wasted time before a desired process is executed.

5. Modified Embodiments

The present disclosure is not limited to the embodiment described above. Appropriate modifications are possible within a scope without departing from the spirit of the present invention.

For example, it is also possible that multiple commands are indicated in multiple command data sets, and the robot controller 30 continuously executes the multiple commands indicated in the multiple command data sets received all at once. Further, for example, it is also possible that a register range of the host control device 20 is not allocated by the engineering device 10 but is fixed by a factory setting at the time of shipment. Further, for example, also when controlling multiple robot controllers 30, the host control device 20 may transmit multiple command data sets to each of the robot controllers 30 by the same process as that in the embodiment.

Further, for example, the functions described above may each be realized by any device in the production system 1. For example, the functions described as being realized by the data collection device 50 may each be realized by the host control device 20 or the robot controller 30. Further, for example, the functions described as being realized by the host control device 20 may each be realized by the data collection device 50 or the robot controller 30. Further, for example, it is also possible that the realization of the functions is not shared by multiple computers, but is performed by one computer.

Further, the above-described embodiments are illustrated as specific examples. The invention disclosed in the present specification is not limited to the structures or data storage examples of these specific examples. A person skilled in the art may modify these disclosed embodiments in various ways, such as changing shapes or numbers of physical structures, data structures, and an execution order of processes. It should be understood that the technical scope of invention disclosed in the present specification also includes such modifications.

A production system according to one aspect of the present invention is provided in which a control device that controls at least one industrial device and a host control device that is capable of controlling the control device are communicably connected. The host control device includes: a register part that has a register that is allocated for controlling the control device and includes a command area; and a transmission part that transmits multiple command data sets written in the command area to the corresponding control device. The control device includes: a communication storage part in which multiple command data sets received from the host control device are written; and an execution part that executes a process instructed by the host control device based on the multiple command data sets written in the communication storage part.

A host control device according to another aspect of the present invention is communicably connected to a control device controlling at least one industrial device and is capable of controlling the control device, and includes: a register part that has a register that is allocated for controlling the control device and includes a command area; and a transmission part that transmits multiple command data sets written in the command area to the corresponding control device.

A control device according to yet another aspect of the present invention is communicatively connected to a host control device and controls at least one industrial device, and includes: a communication storage part in which, when multiple command data sets written in a command area of a register of the host control device allocated for controlling the control device are received, the multiple command data sets are written; and an execution part that executes a process instructed by the host control device based on the multiple command data sets written in the communication storage part.

A communication method according to still another aspect of the present invention is provided for a production system in which a control device that controls at least one industrial device and a host control device that is capable of controlling the control device are communicably connected. The communication method includes: transmitting to the corresponding control device multiple command data sets written in a command area of a register of the host control device allocated for controlling the control device; and executing a process instructed by the host control device based on multiple command data sets written in a communication storage part in which multiple command data sets received from the host control device are written.

A program according to still another aspect of the present invention causes a host control device, which is communicably connected to a control device controlling at least one industrial device and is capable of controlling the control device, to function as a transmission part that transmits to the corresponding control device multiple command data sets written in a command area of a register part having a register that is allocated for controlling the control device and includes the command area.

A program according to still another aspect of the present invention causes a control device, which is communicatively connected to a host control device and controls at least one industrial device, to function as an execution part that executes a process instructed by the host control device based on multiple command data sets written in a communication storage part in which the multiple command data sets are written when the multiple command data sets written in a command area of a register of the host control device allocated for controlling the control device are received.

According to still another aspect of the present invention, the control device is capable of executing multiple programs, a command requesting a program selection and a program name are written as the multiple command data sets in the command area, and the execution part selects a program of the program name based on the command and executes the selected program.

According to still another aspect of the present invention, after the command and the program name are transmitted, new command data requesting start of a program is written in the command area, the transmission part transmits the new command data to the corresponding control device, and the execution part starts execution of the selected program based on the new command data.

According to still another aspect of the present invention, start portion information about a start portion in a program is further written as the command data in the command area, and the execution part identifies a start portion in the identified program based on the start portion information, and executes the identified program from the identified start portion.

According to still another aspect of the present invention, command request information requesting command execution and a command are written as the multiple command data sets in the command area, and the execution part executes the process based on the command when the command request information is updated.

According to still another aspect of the present invention, the control device has multiple functions, a main command requesting one of the multiple functions and a subcommand requesting a process of the function are written as the multiple command data sets in the command area, and the execution part identifies and executes the process based on a combination of the main command and the subcommand.

According to still another aspect of the present invention, detailed information about details of the process is further written as the command data in an area corresponding to a combination of the main command and the subcommand in the command area, and the execution part executes the process based on the detailed information written in the area corresponding to the combination of the main command and the subcommand.

According to still another aspect of the present invention, the host control device further includes an operation control part that writes the multiple command data sets for requesting execution of the process in the command area by executing a control program for controlling the control device, and the transmission part transmits the multiple command data sets written in the command area by executing the control program.

According to still another aspect of the present invention, the host control device and the control device are connected by an asynchronous communication network, and the transmission part transmits the multiple command data sets using asynchronous communication.

According to still another aspect of the present invention, response data indicating an execution result of the process is written in the communication storage part, the industrial device further includes a transmission part that transmits the response data written in the communication storage part to the host control device, and the register part of the host control device has a response area in which response data received from the control device is written.

According to still another aspect of the present invention, the host control device further includes: a comparison part that compares the multiple command data sets with the response data; and an output part that outputs a predetermined alert based on a comparison result of the comparison part.

According to still another aspect of the present invention, the industrial device is a robot, the control device is a robot controller that controls the robot, the host control device is capable of controlling the robot controller, and the process is a process of a robot program which corresponds to an operation unit in an operation program of the robot controller.

According to one aspect of the present invention, the multiple command data sets include a command for executing the robot program, a robot program name of the robot program, and start portion information about a start portion in the robot program, and when the command is received, the execution part identifies the robot program and the start portion based on the robot program name and the start portion information, and executes the identified robot program from the identified start portion.

According to an embodiment of the present invention, for example, communication cost when a host control device causes a control device to execute various processes can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A production system, comprising:
a control device that controls at least one industrial device; and
a host control device configured to communicably connect to the control device and control the control device, wherein
the host control device includes a register memory allocated for control of the control device and including a command area, and circuitry configured to write a plurality of command data sets to the command area and transmit the plurality of command data sets stored in the command area of the host control device to the control device,
the control device includes
a communication memory configured to store the plurality of command data sets received from the command area of the host control device and store response data for transmission to the host control device, and
processing circuitry configured to execute a process instructed by the host control device based on the plurality of command data sets stored in the communication memory,
the communication memory of the control device is configured to store a plurality of functions and at least one process of each of the plurality of functions to be executed by the control device,
the plurality of command data sets includes a main command requesting one of the plurality of functions of the control device, a subcommand requesting a process of the one of the plurality of functions, and detailed information of the process, and
the processing circuitry of the control device is further configured to identify and execute the process based on a combination of the main command and the subcommand and the detailed information of the process.

2. The production system according to claim 1, wherein the plurality of command data sets includes a command requesting a program selection and a program name stored in the command area of the host control device, and the processing circuitry of the control device is further configured to select a program of the program name based on the command and to execute the selected program.

3. The production system according to claim 2, wherein after the command and the program name are transmitted, the command area of the host control device stores new command data requesting start of a program, the circuitry of the host control device is further configured to transmit the new command data to the control device, and the processing circuitry of the control device is further configured to start execution of the selected program based on the new command data.

4. The production system according to claim 3, wherein the plurality of command data sets includes start portion information about a start portion in the program stored in the command area of the host control device, and the processing circuitry of the control device is further configured to identify a start portion in the selected program based on the start portion information and execute the selected program from the identified start portion.

5. The production system according to claim 2, wherein the plurality of command data sets includes start portion information about a start portion in the program stored in the command area of the host control device, and the processing circuitry of the control device is further configured to identify a start portion in the selected program based on the start portion information and execute the selected program from the identified start portion.

6. The production system according to claim 1, wherein the plurality of command data sets includes command request information requesting command execution and a command stored in the command area of the host control device, and the processing circuitry of the control device is further configured to execute the process based on the command when the command request information is updated.

7. The production system according to claim 1, wherein the host control device further includes second processing circuitry configured to store the plurality of command data sets for requesting execution of the process in the command area by executing a control program for controlling the control device, and the circuitry of the host control device is further configured to transmit the plurality of command data sets stored in the command area by the execution of the control program by the second processing circuitry.

8. The production system according to claim 1, wherein the host control device and the control device are connected by an asynchronous communication network, and the circuitry of the host control device is further configured to transmit the plurality of command data sets using asynchronous communication.

9. The production system according to claim 1, wherein the communication memory stores the response data indicating an execution result of the process, the at least one industrial device further includes second transmission circuitry configured to transmit the response data stored in the communication memory to the host control device, and the register memory of the host control device has a response area in which response data received from the control device is stored.

10. The production system according to claim 9, wherein the host control device further includes second processing circuitry configured to compare the plurality of command data sets with the response data and output a predetermined alert based on a comparison result of the comparison.

11. The production system according to claim 1, wherein the host control device further includes second processing circuitry configured to write the plurality of command data sets in the command area and transmit the plurality of command data sets to the control device by executing a control program for controlling the control device.

12. A host control device that communicably connects to a control device for controlling at least one industrial device, comprising:
a register memory having a register that is allocated for controlling the control device and including a command area; and
circuitry configured to write a plurality of command data sets to the command area and transmit the plurality of command data sets stored in the command area to the control device, the plurality of command data sets transmitted to the control device from the command area identifying a process to be executed by the control device, wherein
the control device is configured to store a plurality of functions and at least one process of each of the plurality of functions to be executed by the control device,
the plurality of command data sets includes a main command requesting one of the plurality of functions of the control device, a subcommand requesting a process of the one of the plurality of functions, and detailed information of the process, and
the control device is further configured to identify and execute the process based on a combination of the main command and the subcommand and the detailed information of the process.

13. A non-transitory computer readable medium having stored thereon a program that when executed by the host control device of claim 12, causes the host control device to implement a method comprising:
transmitting, to the control device, a plurality of command data sets stored in a command area of a register allocated for controlling the control device.

14. A control device that communicatively connects to a host control device and controls at least one industrial device, comprising:
a communication memory configured to store a plurality of command data sets written to a command area of a register of the host control device by the host control device when the plurality of command data sets stored in the command area of the register of the host control device are received from the host control device and store response data for transmission to the host control device; and
processing circuitry configured to execute a process instructed by the host control device based on the plurality of command data sets stored in the communication memory,
wherein
the register is allocated for controlling the control device,
the communication memory is configured to store a plurality of functions and at least one process of each of the plurality of functions to be executed by the control device,
the plurality of command data sets includes a main command requesting one of the plurality of functions of the control device, a subcommand requesting a process of the one of the plurality of functions, and detailed information of the process, and
the processing circuitry is further configured to identify and execute the process based on a combination of the main command and the subcommand and the detailed information of the process.

15. The control device according to claim 14, wherein the industrial device is a robot, the control device is a robot controller that controls the robot, the host control device is configured to control the robot controller, and the process is a robot program process.

16. The control device according to claim 15, wherein the plurality of command data sets includes a command for executing the robot program process, a robot program name of the robot program process, and start portion information about a start portion of the robot program process, and when the command is received, the processing circuitry is further configured to execute the robot program process and the start portion based on the robot program name and the start portion information, and the execution of the robot program process is from the start portion.

17. A non-transitory computer readable medium having stored thereon a program that when executed by the control device of claim 14, causes the control device to implement a method comprising:
executing a process instructed by the host control device based on a plurality of command data sets stored in a communication memory, which stores the plurality of command data sets when the plurality of command data sets, stored in a command area of a register of the host control device that is allocated for controlling the control device, are received.

18. A method for communicating a production system, comprising:

writing, by a host control device in the production system, a plurality of command data sets in a command area of a register of the host control device;

transmitting, to a control device in the production system, the plurality of command data sets stored in the command area of the register of the host control device in the production system; and executing a process instructed by the host control device based on the plurality of command data sets stored in a communication memory configured to store the plurality of command data sets received from the command area of the host control device and store response data for transmission to the host control device, wherein the control device controls at least one industrial device in the production system, the host control device controls the control device and is communicably connected to the control device in the production system, and the register of the host control device is allocated for controlling the control device, the control device is configured to store a plurality of functions and at least one process of each of the plurality of functions to be executed by the control device, the plurality of command data sets includes a main command requesting one of the plurality of functions of the control device, a subcommand requesting a process of the one of the plurality of functions, and detailed information of the process, and the control device is further configured to identify and execute the process based on a combination of the main command and the subcommand and the detailed information of the process.

\* \* \* \* \*